United States Patent Office 3,041,930
Patented July 3, 1962

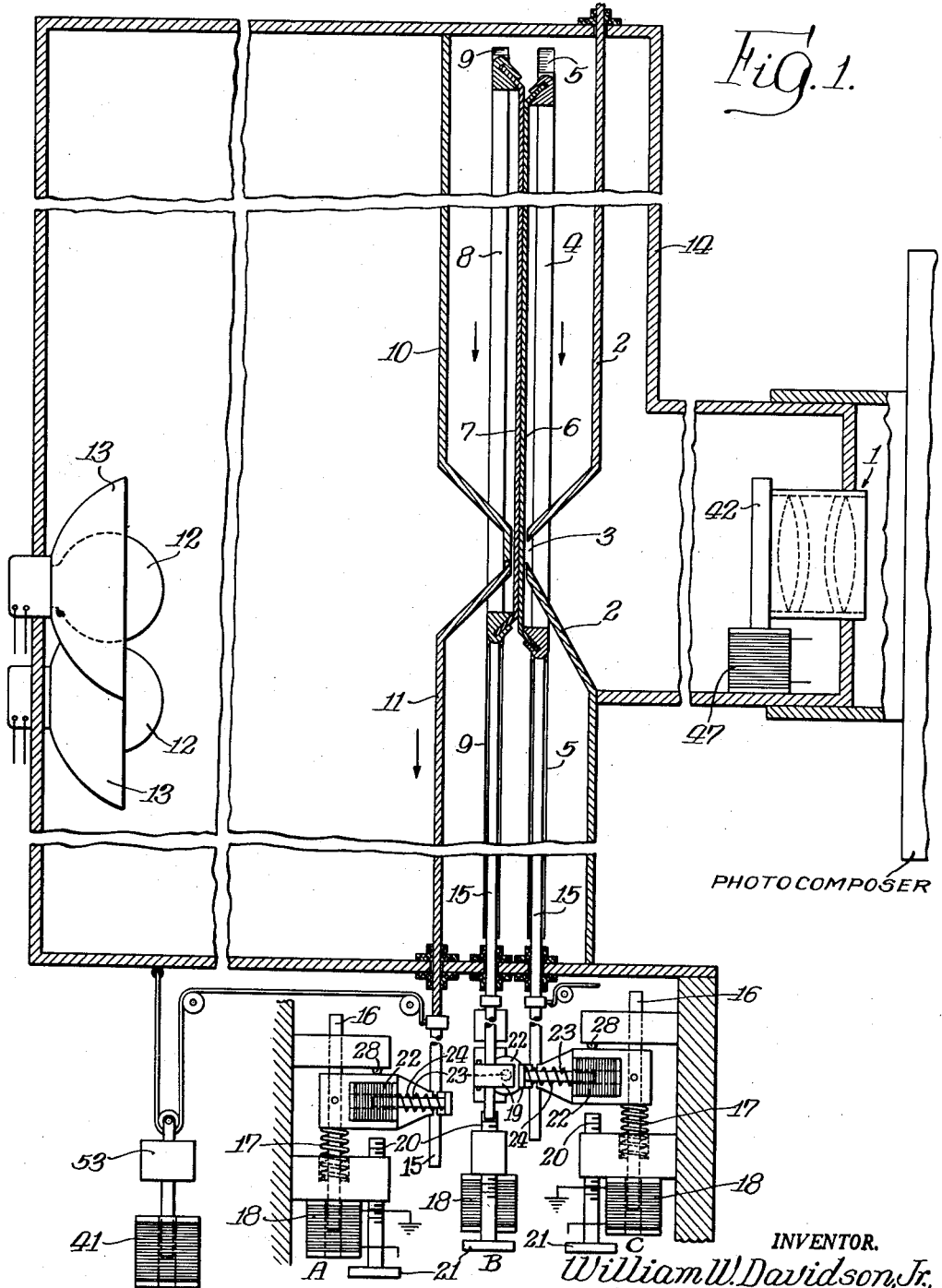

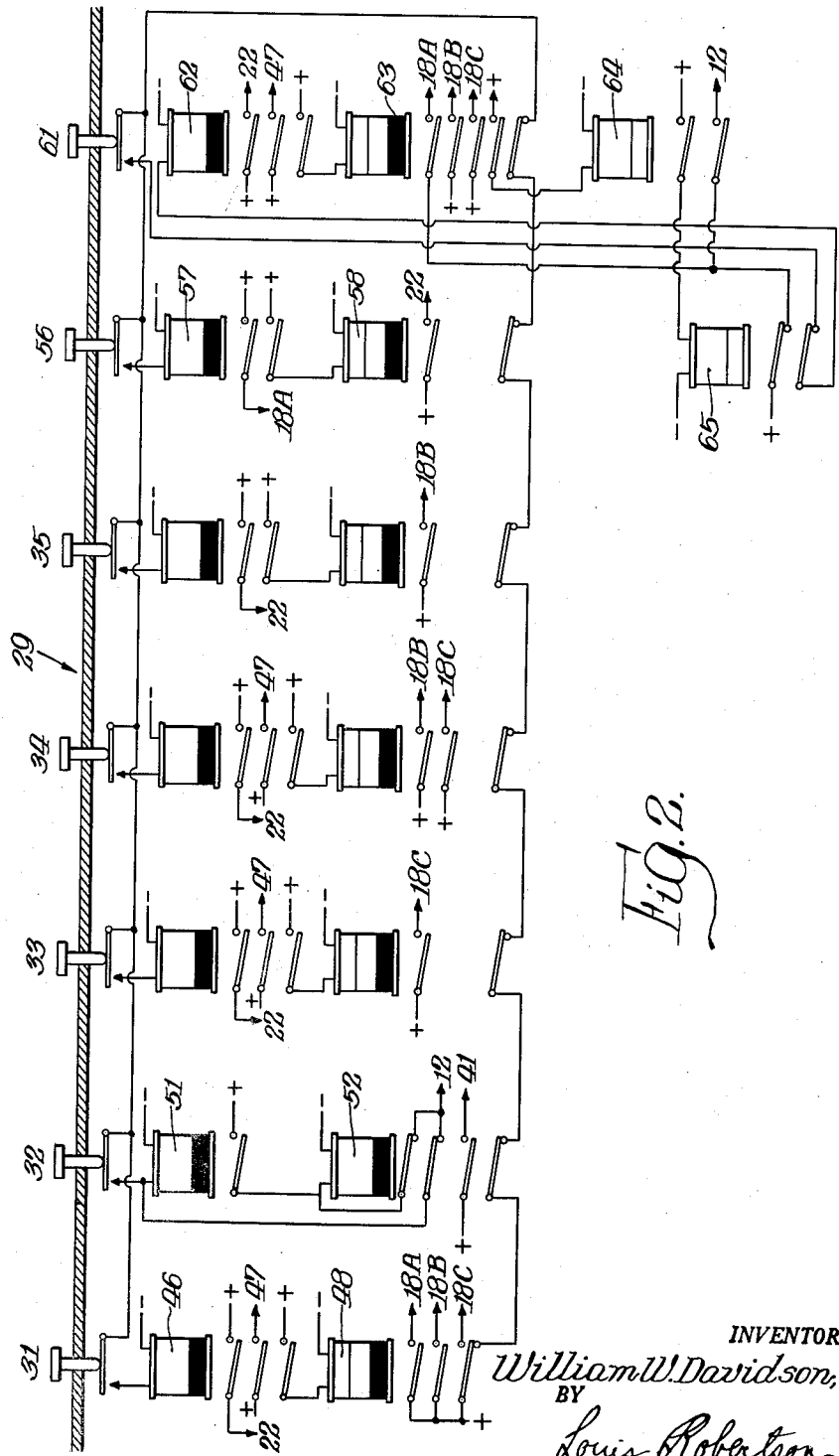

3,041,930
APPARATUS AND METHOD FOR SIMPLIFIED
PHOTOCOMPOSITION CORRECTIONS
William W. Davidson, Jr., 26 Bogart Ave.,
Port Washington, N.Y.
Continuation of abandoned application Ser. No. 159,592,
May 2, 1950. This application Aug. 3, 1960, Ser. No.
47,198
12 Claims. (Cl. 88—24)

"Photocomposition" is a term which may be roughly defined as producing a film, from which a printing plate for use on printing presses is later made, by photographing letters or characters onto the film, especially when a sequence of photographs are made on successive parts of one film for one page of print.

Various methods of and devices for "photocomposition" have been developed and used. Some photograph individual characters onto film one after another, some photograph already-composed lines of characters onto film, some produce "justified" lines of composition (providing a uniform right-hand margin), some do not. Mention should also be made of some refinements of typewriters which type copy in faces supposed to resemble printers' type faces; this copy is then photographed onto film.

These have all had one difficulty in common. When there were errors in the copy as originally composed, either the entire copy had to be recomposed with the errors corrected, with the possibility of further errors being made in the process of recomposing the copy, or the portions containing errors had to be recomposed and these corrected portions "stripped in" to the original copy. This latter involved cutting and pasting, was time consuming, and required great care and skill. Even when done by a highly-skilled individual, there was difficulty and uncertainty in maintaining the proper alignment and spacing in the copy corrected by "stripping in." The processes which produced a film of the copy directly as opposed to the "typewriter" processes, while possessing many other advantages, have encountered the most difficulty in making corrections. Also of course in any case the difficulty has increased as the number of corrections required in a given piece of copy increased.

One method that has been advanced in recognition of these problems involves the use of preliminary films with excess spacing between the lines, these films not being intended for plate making. That method provides for the producing by the photocomposing machine of a second such film, after a proof of the original has been marked to show the corrections required. Onto this second film are recomposed those lines requiring correction in the original. A proof is then made of the second film, preferably on paper distinctive in color or otherwise. The lines in the proof are cut apart and pasted over the incorrect lines on the original proof. Then using this pasted-up proof as a guide, the operator loads both the original film and the second film into a device which will print lines from either film successively by projection onto a third film which is larger than the others and, unlike them, is suitable in line spacing for use in making the plate. Working from the pasted-up proof, the operator then operates this device to print the correct lines from the original onto the third film, swinging the original out of the way and projecting instead a line from the second film to replace each incorrect line in the original. This same device is also used to project lines of different nature, or a second run of corrections, onto the final film from another or a number of other films similarly mounted to be swung into position for projection of lines onto the final film.

This method of making corrections has the advantage (if such preliminary films are to be used, and for one or two sets of corrections in that stage) that it produces a single corrected film of the copy desired without cutting, piecing and stripping in of the film itself but it is a slow and laborious process, it requires the use of several very specialized and expensive separate pieces of equipment and it still involves the cutting and pasting of proofs. It also requires an operator with very specialized training and skills. It also fails to provide for quick additional corrections found necessary after the plate-making film has been produced.

The present invention consists of a method and device which solves these various problems. The apparatus is largely automatic, is easy to operate, fast, comparatively inexpensive, and also broadens the usefulness of a photocomposing machine in other ways beyond the making of corrections, all as will be more fully described herein.

According to this invention, a film representing the faulty composing is placed against one side of a new film and the correct lines or portions of the old film are successively contact-printed onto the new film. Instead of contact-printing a defective line, the new film is exposed to new photocomposition from the other side. Thus as the new film advances, it is exposed selectively to old composition from one side or new composition from the other side. The advancing of the two films is separately controlled.

Corrections are thus made on film without the need of cutting the film or copy to be corrected and then stripping in corrected portions. Also it is only necessary to recompose those portions or those lines in which errors occur. Furthermore, a completely-corrected film is produced in substantially no more time than it takes to recompose the lines or portions in which errors have occurred.

This method and device for making corrections is intended for use on any photocomposing machine, whether it operates to photograph single characters, or whether it photographs assembled lines of characters, and is not affected by whether the photocomposing machine is manually operated, direct keyboard operated, operated by remote control through a perforated tape or otherwise, or is electronically operated. It is also not affected by whether the photocomposing machine is producing or can produce justified lines or not.

In the embodiment of the invention shown and described, a line is the unit of correction and any line in which there is an error is recomposed in exactly the same way in which it was or could have been originally composed on that composing machine.

Lines may be omitted. New lines may be added. In either case, the spacing between lines is properly rearranged. The device and method of the invention can also be used to add to or subtract from the space between all lines in the copy as originally composed, with infinitesimal variation, if desired. From this, it will be understood that the plate-making contemplated involves photographically copying a block of lines at a time, such as a full page, so that the line spacing must be proportionally the same as it is to appear.

This application is a continuation of U.S. application Serial Number 159,592, filed May 2, 1950, now abandoned, and covers the same invention.

Additional objects and advantages will be apparent from the following description and from the drawings, in which:

FIG. 1 is a diagrammatic representation of one form of the invention, and

FIG. 2 is a circuit diagram for FIG. 1.

Although the law requires a full and exact description of at least one form of the invention, such as that which follows, it is, of course, the purpose of a patent to cover each new invention concept therein no matter how it may later be disguised by variations in form or additions of further improvements; and the appended claims are intended to accomplish this purpose by particularly pointing out the parts, improvements, or combinations in which the invention concepts are found.

*Initial Photocomposing*

In the embodiment of the invention shown, a lens 1 of a camera 14 is aligned with a slot 3 in opaque partition 2. A film 6 may first be placed in frame 4 which carries it up and down on track 5, all mounted within a light-tight box or camera 14. In this case it is assumed that the photocomposing machine is of a type that permits photographing an entire line of assembled characters at once. This line is so positioned that its entire image is projected through slot 3 by lens 1. It is therefore unnecessary in this case to provide for any side-to-side motion of the film 6. For photocomposition by photographing a letter at a time, the entire camera 14, except lens 1, could be mounted to move laterally.

The film is mounted with its emulsion side away from the lens 1. Assuming that the composed line to be photographed is right-side up, the advancing of the film is downward, because the lens turns the image upside down. The advancing of film 6 is controlled by a button 33 on the keyboard 29, which in turn acts on the advancing mechanism which is shown at the lower part of FIG. 1 and will be described in more detail later. The film is moved a line at a time by the action of the keyboard button 33 which is depressed after each line has been composed and photographed. The amount the film is moved (or the width of the line) is controlled by the setting of the hand wheel 21 which is calibrated in "points," the conventional units of type height. The lens is focused to project a clear, sharp image through the film to the emulsion side of the film.

*Preparing for Corrections*

After the original copy has thus been composed and photographed a line at a time (in the embodiment shown) on the film in the position shown at 6, the film is then removed and developed. This film may be either a positive or a negative of the copy depending on the kind of photocomposing machine. In either case, when the film is dry it is placed in a contact printer-emulsion to emulsion with another new unexposed piece of film, and, by contact printing, a reverse copy of the original film is made on another similar film. This second film is then developed and dried. Whichever one of these films is a negative is then used to produce any required number of positive prints on paper for use as proofs. This is done by any one of a number of contact-printing processes. Arrangements are preferably made within the photocomposing machine to number the lines by means of small numbers which appear off to the side of each line and can therefore be easily masked out in the usual plate-making process for eventual printing. However, these line numbers will appear on the original film, the reverse film, and on the paper proof or proofs.

The corrections to be made are now indicated on the proof by the proofreader and the proof so marked is returned to the photocomposing operator.

*Placing Films for Correction*

The reverse film, which was made from the original, is now placed in the box or camera 14 in the position shown at 7. Its emulsion side is placed toward the lens 1 and the film is carried by frame 8 sliding in channels 9 and its downward advancement is controlled a line at a time by the action of certain keys on the keyboard 29 which in turn act upon an advancing mechanism similar to that shown, all of which will be more fully described.

A new, unexposed film is placed in the box or camera 14 in frame 4 so that it may now be considered a new film 6. Its emulsion side is placed away from the lens 1. In other words it is placed emulsion-to-emulsion with the film 7. The downward motion of new film 6 is controlled, a line at a time and, as previously described, by key or button 33. It may also be controlled by certain of the other keys as will be more fully described.

The slot 3 may extend across the entire width of partition 2, and may be as wide vertically as the highest line to appear in the final film, corresponding to the greatest individual height of line produced by the photocomposing machine. The slot 3 can alternatively be made adjustable so that its vertical dimension matches the line height of the particular lines being composed. The entire opaque partition 2 is only a safety device to protect the film 6 from being exposed to any extraneous light outside of the line which it is desired to photograph. If the lens is properly shielded from any extraneous light other than that coming from, or reflected from, the line being photographed, then the partition 2 may be completely done away with without interfering with the proper operation of the invention, unless it is found that too much light passing through the films from lamp 12 spreads over the film 6.

There is another opaque partition 10 which is in a fixed position and extends across the entire width of the box or camera 14 and from the top of the box down to a line parallel with the bottom of the slot 3 in partition 2. The bottom of slot 3 is always in fixed position and may correspond to the "top" of the inverted line being photographed, perhaps including a given amount of the space between lines. If slot 3 is adjustable as to its vertical dimension, this adjustment will be accomplished by moving the top portion of partition 2. The partition 10 and a movable partition 11 are positioned between the film 7 and the back of the box or camera 14, where a light 12 and reflector 13 are mounted, and at their adjacent edges are very close to and at times preferably in contact with the film 7. The films may be suspended at their sides, instead of as illustrated, to allow partitions 10 and 11 to be close to them along their entire length. Partition 11 also extends across the entire width of the box or camera 14.

This partition 11 is movable up and down. In its topmost position, its upper edge contacts the lower edge of partition 10 and its lower edge projects from the bottom of the box 14 through a light-tight slot. Thus when partition 11 is in its topmost position it may form with partition 10 a continuous, completely opaque and light-tight wall separating the light 12 mounted at the back of the box 14 from films 6 and 7.

The partition 11 can be moved downward in steps corresponding to the thickness of a line at a time by the action of certain of the keys on the keyboard 29, working through an advancing mechanism similar to that shown. The exact distance it moves down at each step, corresponding to the movement of film 6 for successive lines, is controlled by a hand wheel 21 associated therewith. The hand wheel or dial is calibrated to show the height of the lines in points but can vary it infinitesimally through the range provided.

The partition 11 can also be returned to its topmost position by the action of a return solenoid controlled by certain keys on keyboard 29, all as more fully described hereafter. All surfaces of partitions and other surfaces within camera 14 are a dull black.

*The Advancing Mechanisms*

Each of the two film-carrying frames 4 and 8 and the opaque partition 11 are counterbalanced by means of weights such as weight 53 for partition 11 so that they will stay stationary unless moved by the advancing mechanism (or manually when being loaded) and will not move either up or down under the action of gravity.

There is a rod 15 fastened to each film-carrying frame 4 and 8 and to the opaque partition 11 and extending downward therefrom. The advancing mechanisms are similar, and for simplicity, that for film 6 is described. The advancing mechanism for film 6 operates on the associated rod 15 and may be located within the box or camera 14 or below it, as shown. In this latter case, the rod 15 will extend through a light-tight seal in the bottom of the box 14. Rod 15 is moved up or down by coupling it to a rod 16 which is then moved as desired by spring 17 or solenoid 18. Clamping device 19, carried by rod 16, surrounds the rod 15. Movement is limited by stop 20, adjusted by handle 21. The clamping device 19 is actuated by a solenoid 22 which when electrically actuated draws a plunger 23 to the right and causes the clamping device to firmly grip the rod 15. When not thus actuated, the clamping device is held open by the spring 24. Thus when the solenoid 22 is electrically actuated, the rod 15 will be caused to move with the clamping device. At other times, the clamping device can move while the rod 15 remains stationary.

Rod 16 is caused to move by the action of spring 17 and down by the action of solenoid 18, in a fixed position with respect to the box 14. The upward movement of the rod 16 and the clamping device is limited by a fixed stop 28. Hand wheel 21 is calibrated to show the movement of the clamping device and thus of the rod 15 and the film-carrying frame 4 in "points." The advancing mechanism controlling the movement of the opaque partition 11 differs in that there is a return solenoid which acts on the associated rod 15 independently of its rod 16 and when electrically actuated raises this rod 15 and the partition 11 all the way up until the partition contacts partition 10.

The light source represented by the light 12 and the reflector 13 is also controlled by the action of certain of the keys on the keyboard 29 and may be of any suitable type for rapidly and uniformly exposing that portion of the film 6 which is not shielded from the light either by the opaque portions of developed film 7 or the opaque partitions 10 and 11. There may be one or a number of lights all controlled from the keyboard as a single light source in the form of the invention illustrated and described. There may also be a light-diffusing plate between the light 12 and the films.

When the new unexposed film 6 and the developed reverse film 7 are loaded into their respective positions in the box or camera 14, the numbers that number the lines on the developed reverse film will be off to one side of the lines and will be masked or shielded from the light 12 preferably by an extension of partition 10 which will extend down one side of the camera to the bottom and overlap partition 11 along this side. This extension of partition 10 will not extend toward the vertical center line of the film far enough to obscure any portion of the film on which the actual copy appears. As the new film 6 is exposed, partly by the photocomposing machine and partly by the contact-printing of copy from the developed reverse film, the lines preferably will in all cases be renumbered by the photocomposing machine or by light focused on the film 6 by the lens 1 and coming from a numbering unit at the same distance from the plane of the lens as the original characters in the photocomposing machine but off to one side. In any case, the numbering unit will be actuated once for each line and the newly-exposed film 6 will thus have all its lines properly numbered in order even though lines may have been added or left out, or the spacing of lines may have been changed, as compared to the developed reverse film 7.

*Producing Corrected Film*

When the two films are thus loaded in the camera, the operator will take the corrected proof and begin to produce the new film called for. He will first set the three hand wheels 21. For example, they may all be set to the "point" height of the lines in the original proof. These three dials control the amount of movement of the films 6 and 7 and of the partition 11. When properly loaded and ready to start, the "top" of the top line of the copy on the developed reverse film will be at the bottom as the film is loaded in the camera and will be in line with the bottom of the partition 10.

For each line in the copy in which no correction is required, the operator will simply depress key 31 on the keyboard 29. This will make contacts which will first actuate all three clamp solenoids 22 on the advancing mechanisms controlling the movement of both films 6 and 7 and the partition 11. This will cause the three rods 15 to be gripped by their advancing mechanisms as described. Then the three solenoids 18 will be actuated, causing the three rods 15, together with the two films 6 and 7 and the partition 11 to be moved downward until the stops 20 are contacted. This will be a distance corresponding to the desired over-all height of the lines as set by the calibrated wheels 21. By over-all height is meant the distance from the top of one line to the top of the next, assuming like characters in both lines. When these stops are contacted, the movement will be stopped. The key 31 returns to its normal position of rest under the action of a spring (not shown). Contacts controlled by this key or by relays controlled by it will first break the circuit actuating solenoids 22, thereby releasing the hold of the advancing mechanism on the rods 15 and then deenergize solenoids 18 to allow the springs 17 to return the advancing mechanisms to their position of rest in contact with fixed stops 28.

Thus as key 31 is depressed and returns to its normal position, both films and the partition 11 move downward a distance equal to the over-all height of one line. This line is then opposite to the slot which will have been opened between partitions 10 and 11. The next line is opposite slot 3 in partition 2 in line with the center of the lens 1.

If the next line also requires no correction, key 31 is depressed again and the two films 6 and 7 and the partition 11 move down the over-all height of another line and the slot is opened to equal the over-all height of the two lines, etc.

When the operator comes to a line that requires correction, he first depresses key 32 which turns on the light 12 for a short-time interval, properly timed to properly expose the film 6 through the developed reverse film 7. The action of key 32 as it returns to its normal position, or the action of relays controlled by it, then actuates the return solenoid 41 or other form of return motor which acts through counterweight 53 on the partition 11 and thus returns the partition 11 to its raised position, in contact with partition 10. When it reaches this raised position, it may contact a micro switch which breaks the circuit actuating this additional return motor and thus cuts off the lifting force. Alternatively, the circuit may be broken after a sufficient time by relays.

The operator then recomposes the line in which there was an error, incorporating the corrections or changes indicated on the corrected copy of the proof which he has before him. When he has completed the line and it has been photographed or is ready to be photographed on film 6 through slot 3, he depresses key 34 on the keyboard 29. This opens shutter 42, if it has not been opened already and operates the advancing mechanisms for the films 6 and 7 but not the advancing mechanism for the partition 11.

The image of the line as it was originally composed will not be printed from the reverse film 7 onto film 6 since in the operation of the device this line will not appear opposite the slot which opens from time to time between partition 10 and partition 11 but will always be shielded from the light 12 by either the partition 10 or the partition 11.

The operator thus recomposes only those lines in which there are errors to be corrected or changes to be made as indicated on the corrected proof and for each line which does not require correction he needs only depress key 31, to advance the two films and the movable partition. When he comes to a line that requires correction, he depresses key 32 to first expose the preceding correct lines and close the opening between the partitions 10 and 11. He then recomposes the line requiring correction and depresses key 34 to advance the two films but without moving the partition 11. If one line requiring correction directly follows another which required correction, it is not necessary to depress key 32 before proceeding to recompose the second line. However, no harm will result should this be done since the partitions 10 and 11 will preferably be in tight-light contact and therefore no further exposure of film 6 will result from the light 12 being turned on. Even if partitions 10 and 11 are not quite in light-tight contact, the light would fall between lines on film 7 and hence would not penetrate to film 6.

*Further Steps*

When this process has been completed for each line in the copy the film 6 is removed and developed and dried. A new proof is made and checked and if no further corrections are required the film, or a reverse film made therefrom, is ready for use in the plate-making process.

Thus a completely corrected, photographically-composed film has been prepared and made ready for plate making therefrom without cutting and stripping, without any hand work on the film, and yet it has only been necessary to recompose those lines in which errors occurred or in which changes were desired. Of course, if further errors are found or further changes are desired, a reverse film can be made from the film produced at 6 and this reverse film can be inserted in the box or camera 14 at 7 and the process repeated. This can be done repeatedy as many times as are necessary until a completely correct film is produced. Each time it will only be necessary to recompose those lines in which errors occur, all as described above.

*Omitting or Inserting Lines*

If it is desired to leave out a line, it is only necessary to depress key 35 which will cause reverse film 7 to advance one line but will not move film 6 or partition 11.

If it is desired to add a line or lines it is only necessary to depress key 33 after each added line has been composed and photographed. This will advance film 6 one line but will not move film 7 or partition 11.

*Changing Spacing of Lines*

If it is desired to change (either increase or decrease) the spacing between the lines, the calibrated control handles 21 controlling the amount of movement of the film 7 and the partition 11 should both be set to correspond to the over-all height of the lines in the reverse film 7. The calibrated control handle 21 controlling the amount of movement of the unexposed film 6 should be set to correspond to the new over-all height of the lines that is desired.

It will be clear that changes in the distance between lines can thus be made automatically while other corrections are being made or can be made, even if no corrections are required other than the respacing of the lines.

The controllable stops 20 on the three advancing mechanisms may each be made as a turret embodying a plurality of adjustable stops, the turret being pivotable about fixed supports so that each of its stops may be readily swung out of the way and another similar controllable stop swung into position in its place. Several controllable stops may thus be provided for each rod 16 and each for one rod 16 preset for a different line height. Copy containing lines of various height may thus be composed or corrected rapidly by swinging the proper controllable stops (preset for the desired line height) into position as required.

A similar result could be obtained with even greater operating efficiency by having keys on the keyboard select the stops to be used. The desired stop could be effectuated by having a solenoid which could either move the whole stop into position or move a dog into actuating position over the stop selected for use.

The keyboard 29 may be a separate keyboard or it may be incorporated into the keyboard of the photocomposing machine. The keys should be appropriately labeled to indicate the use of each.

It is contemplated that there be a counting device (preferably electrically operated) with its indicating face readily visible to the operator which will count each movement of the reverse film 7 and thereby indicate to the operator by number at all times which line of that film is opposite slot 3 in partition 2 and in line with the center of lens 1. Since the lines on the proof from which the operator works are numbered the same as the lines on the reverse film 7, this will tell the operator where he is in relation to the proof at any time. There will be another counting device with its indicating face similarly visible to the operator which will count each movement of film 6 and thereby tell the operator at all times how many lines have been photographed onto the film 6. This may be the same counter used to number the lines on film 6.

The drawings are diagrammatic in character and show the basic elements of the invention. However, it is contemplated that many changes in arrangement and detail may be made. For instance, it may well prove best that the entire films 6 and 7 and film-carrying frames 4 and 8 (or their equivalent) not be in two approximately parallel planes throughout their entire length but that they diverge from each other at both top and bottom and that the two films 6 and 7 pass over rollers which will hold them in close contact, emulsion to emulsion, throughout the area of the slot between partitions 10 and 11, when partition 11 is at its lowest point.

It is also contemplated that while the invention is shown and described on the assumption that all the films used are full-scale films, exactly the same device can be employed on a smaller scale, using so-called miniature films, such as 35 mm. film, with all the images proportionately reduced, thus always having the same proportional line spacing as is desired in the ultimate printing plate. In this case, full-size proofs could be made by projection printing and the final corrected miniature film could be projection-printed onto a full-scale film for use in plate making.

Although it is at present preferred to use a reverse film 7 as described, this is not always essential. The original film can be used in position 7, the emulsion side being toward lamp 12, as it was positioned while being made. Although this has a slight tendency to make the contact image on new film 6 slightly less sharp, that can be overcome by using a light source in place of 12, which projects nearly parallel rays through film 7 to film 6. This also introduces complications in correlation with the photocomposer as to character, namely, negative or positive. It may nevertheless be desirable in a large shop where the apparatus of this invention would be used only for corrections. The correction photocomposer could then be of reverse character as compared to those used for original composing, so that the original film and the reverse photocomposer would produce a uniform new film. If the background of film 6 is black when developed, that is, if film 6 is a negative, the spaces between the lines should overlap slightly to avoid any demarcations on the film between lines. Thus slot 3 in partition 2 should be set to be slightly wider than the overall height of the lines being produced, and in the form of the invention (later described) in which partition 11 never moves down more than one line at a time, it can be set by its hand wheel 21 to move slightly more than the over-all height of the line.

Although the manner of control by the keys is subject to wide variation, one has been illustrated for completeness and by way of example.

Each key directly controls a contact for energizing an initial relay. Thus key 31 energizes relay 46. All of the solenoids 22 are energized by this relay through one front contact, meaning one closed when the relay is energized. Each solenoid 22 would be controlled through a separate contact, if there should be a desire to sometime actuate one but not all of them. Energizing them when they are idle does no great harm, however. Another front contact energizes shutter solenoid 47. This is desirable to expose the film to the line-numbering characters. The photocomposer would otherwise be dark when key 31 is actuated. A third front contact of relay 46 would energize relay 48, which may have a slightly retarded pick-up so as to give solenoid 22 time to set the clamp 19. The three front contacts for relay 48 energize the three solenoids 18. Relay 46 is of a slow release type, so as to hold clamp solenoids 22 energized long enough for a complete movement by solenoids 18 even if key 31 is quickly released. Relay 48 is of slightly slow release characteristics to be sure clamps 19 are released before solenoids 18 are deenergized to allow springs 17 to return bars 16 and clamps 19 to their starting positions. A back contact of relay 48 may be used in an interlocking circuit so that no other key can close its circuit until relay 48 has released its armature. Another relay could be provided in this interlock to be sure time is allowed for return of the parts by springs 17. Also the keys could be physically interlocked to prevent simultaneous operation.

Keys 33, 34 and 35 have similar controls but omit contacts for certain of the solenoids 18. Thus key 33 operates (through its second relay) only the C solenoid 18, namely, that for advancing film 6. Key 34 operates solenoids 18 at C and B, B being the one which advances the film 7. Key 35 operates solenoid B. Key 35 omits the contact for energizing shutter solenoid 47 because it does not need to be energized when a line of the film 7 is being omitted, this being the function of key 35. Key 32 closes a contact which energizes relay 51 and simultaneously through a back contact of relay 52 lights lamp 12. The sequential pick-up of relays 51 and 52 probably will allow enough exposure time for lamp 12 to expose film 6 through film 7, but if not relay 52 may have a retarded pick-up. When relay 52 does pick up, it extinguishes lamp 12 and energizes return solenoid 41 to draw down counterweight 53 (FIG. 1) and thereby raise partition 11 against partition 10. Relay 52 is of sufficiently slow release to allow time for this movement.

Key 56 is a back-liner key. If key 31 is pressed when key 34 should have been, key 56 may be pressed to move partition 11 back where it was before key 31 was mistakenly pressed. The contact of key 56 energizes relay 57 which energizes solenoid 18 at A and energizes relay 58. The latter energizes clamp solenoids 22 after solenoid 18 has had time to move the bar 16 for partition 11 to its lower position. Relay 57 releases its armature first, thus breaking the circuit of solenoid 18 and allowing spring 17 at A to return bar 16, rod 15 clamped to it, and partition 11. Then slow release relay 58 drops its armature to release clamps 19.

There should also be a back-liner key for each of the films, and there may be back-liner keys for all three advancing elements or various combinations. These have not been illustrated.

Separate contacts wherever appropriate may operate the counters. However, the photocomposer line counter and the visible line counter for film 6 may be in parallel with shutter solenoid 47, and the counter for advancement of film 7 may be in parallel with the solenoid 18 for film 7. Preferably, the operations performed by keys 31 and 32 as described heretofore can be combined in a single key 61. In this form of the invention, the slot between partitions 10 and 11 will never open wider than the proper height for exposing a single line, as determined by the setting of the calibrated control wheel 21. In this case the depressing of this single key 61 will advance both films 6 and 7 and the partition 11, will turn on and off the light 12 to accomplish the proper exposure, and will return the partition 11 to its upper position in contact with partition 10. It then becomes only necessary to depress this one key 61 once for each line which requires no correction, and to depress key 34 once after recomposing and photographing each line which does require correction.

The contact of key 61 energized relay 62, which performs, with relay 63, all of the functions of key 31, advancing films 6 and 7 and partition 11 by energizing solenoids 18 while clamp solenoids 22 are energized. Next, relay 54 connects lamp 12 and simultaneously energizes relay 65. Relay 65, which may have a slightly retarded pick-up, breaks the circuits for lamp 12, for relay 62 and for solenoid 18 at A, the latter allowing its spring 17 to return the partition 11. Relay 62 releases slowly enough to drop its armature only after partition 11 has had time to return. The circuit for clamp solenoids 22 are broken by release of 62 and thereafter relay 63 releases its armature and thereby breaks the circuits to the remaining solenoids 18 and causes successive deenergization of relays 64 and 65.

The reference to retarded relays should not give the impression of slow action. Quick-acting relays adjusted for slightly less than maximum speeds may be enough. If return springs 17 are slow acting, they may be replaced by solenoids with suitable contacts. More contacts operated physically by the keys may be used if found faster. The delay for return of partition 11 may be avoided by leaving this partition open. Indeed, it may be manually set, and changed manually only when the changed advancement of film 7 so requires. This form may be found preferable not only because of its speed but because of its simplicity. A single key could easily cause advancement of the two films and then illumination of the lamp as they come to rest.

The circuits and apparatus could be simplified by using a single solenoid in each advancing mechanism, arranging it to first clamp rod 15 and then advance it. This would not lend itself so well to the controlled return, however. Although shutter 42 has been assumed throughout to control exposure through lens 1, it may be omitted when the exposure is otherwise controlled, as by timed illumination of the characters set up in the photocomposer.

*Registration*

Any suitable means may be provided for facilitating proper registration (positioning) of the films at the start. For example, frames 4 and 8 may each have seats against which the leading and one side edge of each film is pressed as they are clamped to the frames. The frames should be started against top stops and side tracks accurately positioned to place these seats in perfect alignment or registration. It is then merely necessary that the same edges be aligned in contact printing the reverse film. It will follow that the reverse film 7 will have its first line in exact registration with the same line should it be freshly photocomposed and projected onto new film 6 by lens 1.

Camera 14 may be opened up and parts therein shifted as much as necessary to give access for placing the films in the frames. Also the frames may be removable for placing the films therein. The fresh film could be mounted on frames 4 or sub-frames in the darkroom and slid into the camera from a cartridge making a light-tight seal with the camera.

The term "film" is used broadly to include any photosensitive material. Flexible film transparent except for the emulsion is much preferred.

The term "contact-printing" is used broadly to indicate the general type of printing called contact-printing and is not intended to require actual contact. Usually the light passes through the film being copied but in special forms the light may approach through the fresh film, and be reflected back to it by the light areas of the film or copy being reproduced. In such case the element "7" may be opaque copy, but may still be called film for convenience.

I claim:

1. Photocomposition correction apparatus including a character-selecting photocomposing means of a type used for ordinary textual composition of films suitable after processing for block use in making a printing plate, having a projection lens arranged to project a focused light beam from characters in the photocomposing means selected one at a time under the ultimate control of an operator at a keyboard; first and second film holders with the first film holder positioned to hold its film in the focal plane of the beam from said lens, and the second film holder beyond the first film holder from the lens and in relationship to the first film holder to produce same-size latent image on unexposed film on the first film holder from visible images on developed film of the second film holder representing textual matter of which a part needs correction; means for moving each of the film holders to advance its film through successive steps of equal and predetermined length corresponding to line spacing, said moving means being adjustable by the operator as to the length of steps independently for the two film holders through a range of adjustment which includes a step at least as short as a single line spacing, said apparatus including operator-controlled light means for exposing images of lines which are correct on the developed film onto the unexposed film, and control means for successively operating said apparatus to expose successive line areas of the unexposed film by selecting at will exposure through the lens to selected characters in the photocomposing means or exposure to an image on the film in said second film holder illuminated by said operator controlled light means, said apparatus including control means for causing the advance of the first film holder for successive exposures and its advance at will without exposures, and including means for causing the second film holder at will to advance without advance of the first film holder, to advance with advance of the first film holder, or to remain stationary while the first film holder advances; said second film holder and its advancing means being adapted to hold a film bearing at least a full image for block use in plate making of the image being produced on the unexposed film carried by the first film holder and to advance it through the successive steps for the lines thereof; said apparatus including means for confining exposure to a desired narrow area corresponding to the height of line image matter being copied, said last-named means being adjustable for various type sizes.

2. Photocomposing correction apparatus in accordance with claim 1, in which the film holders are disposed to hold the films in contact with one another.

3. Photocomposing correction apparatus in accordance with claim 2, in which the light means includes a source of light disposed beyond the developed film held by the second film holder from the unexposed film held by the first film holder to produce contact printing on the latter of these films from a visible image on the former of these films.

4. Photocomposing correction apparatus in accordance with claim 1, in which the light means includes a source of light positioned to direct the light toward film carried by the film holders independently of said lens.

5. Photocomposing correction apparatus in accordance with claim 1, in which the means for confining exposure includes partition means, a portion of which is shiftable an adjustable distance in the direction of film movement to leave an exposure gap.

6. Photocomposing correction apparatus in accordance with claim 1, in which the means for confining exposure includes partition means, a portion of which is shiftable in the direction away from another portion of the partition means to leave an exposure gap.

7. Photocomposing correction apparatus in accordance with claim 1, in which the light means includes a light source beyond the film held by the film holders from the lens and the means for confining exposure includes partition means on both sides of the film for forming exposure gaps, the gap on the side toward the lens being staggered with respect to that on the side toward the light source.

8. Photocomposing correction apparatus in accordance with claim 1, in which the adjustable moving means includes a screw-adjustable stop and means for moving the film moved against said stop.

9. Photocomposing correction apparatus in accordance with claim 1, in which the control means includes means actuated by an operator at a single instant for selecting both the manner of exposure and the movement of film-holding means.

10. The method of producing a corrected film, suitable for immediate use in making a printing plate, from a first film similarly suitable for immediate use in making a printing plate but having an erroneous line therein, which includes the steps of applying a developed film representing a simple same size image of the image in said first film, reversed as compared to the first development of the image in said first film, and a fresh film in relationship for producing on the fresh film a same size latent image of a visible image on the developed film, selectively advancing said fresh film and developed film with line spacing steps variably controlled as to length of step, and selectively exposing the line portions of the fresh film to exposure to the developed film when the line of the developed film is correct, and when the line of the developed film needs correction, operating a photocomposing projector to select characters and expose the line portion of the fresh film to the projection of said characters.

11. The method of producing a corrected film, suitable for immediate use in making a printing plate, from a first film resulting from selecting and photographing characters in a photocomposing machine and similarly suitable for immediate use in making a printing plate but having an erroneous line therein, which includes the steps of applying a developed film representing a simple image of the image in said first film, reversed as compared to the first development of the image in said first film, and a fresh film in relationship for producing on the fresh film a latent image of a visible image on the developed film of the same size as the image on the first film, selectively advancing said fresh film and developed film with line spacing steps variably controlled as to length of step to provide on the fresh film line spacing desired for printing plate making, and selectively exposing the line portions of the fresh film to exposure to the developed film when the line of the developed film is correct, and when the line of the developed film needs correction, operating said photocomposing projector to select characters and expose the line portion of the fresh film to the projection of said characters.

12. The method of producing a finally corrected, developed film of photographically composed text matter for block use in making a printing plate which consists of first producing a latent image of said text matter in the desired type face on an original film through individual character selection in a photocomposing machine and exposure of said characters into lines on the original film with the proper relationship between character size and character, word and line spacing so that when, after development and proofreading, there are no errors to be corrected, the original film so produced is ready for block use in the production of a printing plate; which method also includes the further steps, when corrections are found to be necessary, of placing a fresh film in the photocomposing machine in place of the original film, and placing a developed film, the visible image on which is a reverse of the latent image on the original film, in position for copying portions thereof onto the fresh film and then producing a new latent image on the fresh film by copying some lines, which do not require correction, from the developed film onto the fresh film and by exposing other line areas of the fresh film, representing lines which were incorrect on the original film, to new composition by the photocomposing machine, selectively advancing the two films relatively as required to provide the desired line spacing on the fresh film, the character size and line spacing of the latent image of the new composition on the fresh film being the same as the character size and line spacing of the latent image of the text copied onto the fresh film from the developed film, and the entire latent image on the fresh film having the proper relationship between character size and character, word and line spacing so that when, after development and proofreading, there are no further errors to be corrected, the fresh film so produced is ready for block use in the production of a printing plate; and which method also includes the steps, as many times as corrections are found to be necessary, of repeating said further steps, using a new fresh film and a new developed film the visible image on which is a reverse of the latent image on the last produced film, until a final film shall be produced and developed which proof-reading shall disclose to contain no errors.

References Cited in the file of this patent

UNITED STATES PATENTS

| | | |
|---|---|---|
| 1,591,118 | Friess | July 6, 1926 |
| 2,027,026 | Dirkes et al. | Jan. 7, 1936 |
| 2,355,268 | Bryce | Aug. 8, 1944 |
| 2,616,330 | Westover | Nov. 4, 1952 |